(12) United States Patent
Ennis et al.

(10) Patent No.: US 6,431,582 B1
(45) Date of Patent: *Aug. 13, 2002

(54) SIMPLIFIED DRIVER SIDE AIR BAG ASSEMBLY

(75) Inventors: Thomas A. Ennis, Troy; Brian C. Ford, Mt. Clemens; Derek Perkins, Farmington Hills, all of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 25 days.

This patent is subject to a terminal disclaimer.

(21) Appl. No.: 09/718,182

(22) Filed: Nov. 21, 2000

Related U.S. Application Data

(62) Division of application No. 09/250,573, filed on Feb. 16, 1999, now Pat. No. 6,149,184.

(51) Int. Cl.[7] .............................................. B60R 21/16
(52) U.S. Cl. ................................. 280/728.2; 280/731
(58) Field of Search ............................. 280/728.2, 731

(56) References Cited

U.S. PATENT DOCUMENTS 5,423,568 A * 6/1995 Zushi et al. ............. 280/728.2
5,427,406 A * 6/1995 Zushi et al. ............. 280/728.2
5,683,100 A * 11/1997 Enders ..................... 280/728.2
6,149,184 A * 11/2000 Ennis et al. ............. 280/728.2

FOREIGN PATENT DOCUMENTS

EP 0671 299 A1 * 3/1995 ............. 280/728.2

* cited by examiner

Primary Examiner—J. J. Swann
Assistant Examiner—L. Lum
(74) Attorney, Agent, or Firm—Markell Seitzman

(57) ABSTRACT

An air bag module (20) comprising: a housing (22) having a first opening (102) within a first housing portion (100), a retaining member (24) having a second opening (52) and at least one pair of opposed open faced ramps (40a,b), an air bag (26) having an inflatable cushion portion (80) and a neck portion (82), the neck portion is located between the housing and retaining member (24), a cover (30) to protect the air bag, the cover being opened by the air bag upon inflation thereof, and an inflator (28) received within the first opening from a bottom of the first housing portion (100) and into the second opening (52), the inflator including a flange (36); wherein with an edge of the inflator flange located proximate a respective open face of a ramp and the inflator rotated, the flange engages the ramps and is drawn toward the retaining member thereby sandwiching the housing and air bag therebetween.

3 Claims, 11 Drawing Sheets

SIMPLIFIED DRIVER SIDE AIR BAG ASSEMBLY

This application is a division of application Ser. No. 09/250,573, filed Feb. 16, 1999 now U.S. Pat No. 6,149,184.

BACKGROUND AND SUMMARY OF THE INVENTION

The present invention relates to a driver side air bag system and more particularly one that clamps a housing, retainer member, air bag and inflator together without the use of separate fasteners.

It is an object of the present invention to provide an improved air bag system that is easy to manufacture and assemble. It is a further object of the present invention to provide an air bag module in which various parts of the module are interconnected.

Accordingly the invention comprises an air bag module comprising: a housing having a first opening within a first housing portion, a retaining member having a second opening and at least one pair of opposed open faced ramps, an air bag having an inflatable cushion portion and a neck portion, the neck portion is located between the housing and retaining member, a cover protects the air bag, the cover being opened by the air bag upon inflation thereof, and an inflator received within the first opening from a bottom of the first housing portion and into the second opening, the inflator including a flange; wherein with an edge of the inflator flange located proximate a respective open or receiving face of a ramp and the inflator rotated, the flange engages the ramps and is drawn toward the retaining member thereby sandwiching the housing and air bag therebetween. In one embodiment the flange is segmented and also includes a ramped portion to engage the ramps on the retaining member. In another embodiment the ramps are fabricated on an elevated portion of the retaining member. In this embodiment the inflator flange is generally flat.

It is a further object of the present invention to reduce the number of components required to manufacture an airbag module and thereby reduce cost.

Many other objects and purposes of the invention will be clear from the following detailed description of the drawings.

DETAILED DESCRIPTION OF THE DRAWINGS

Figure 1:
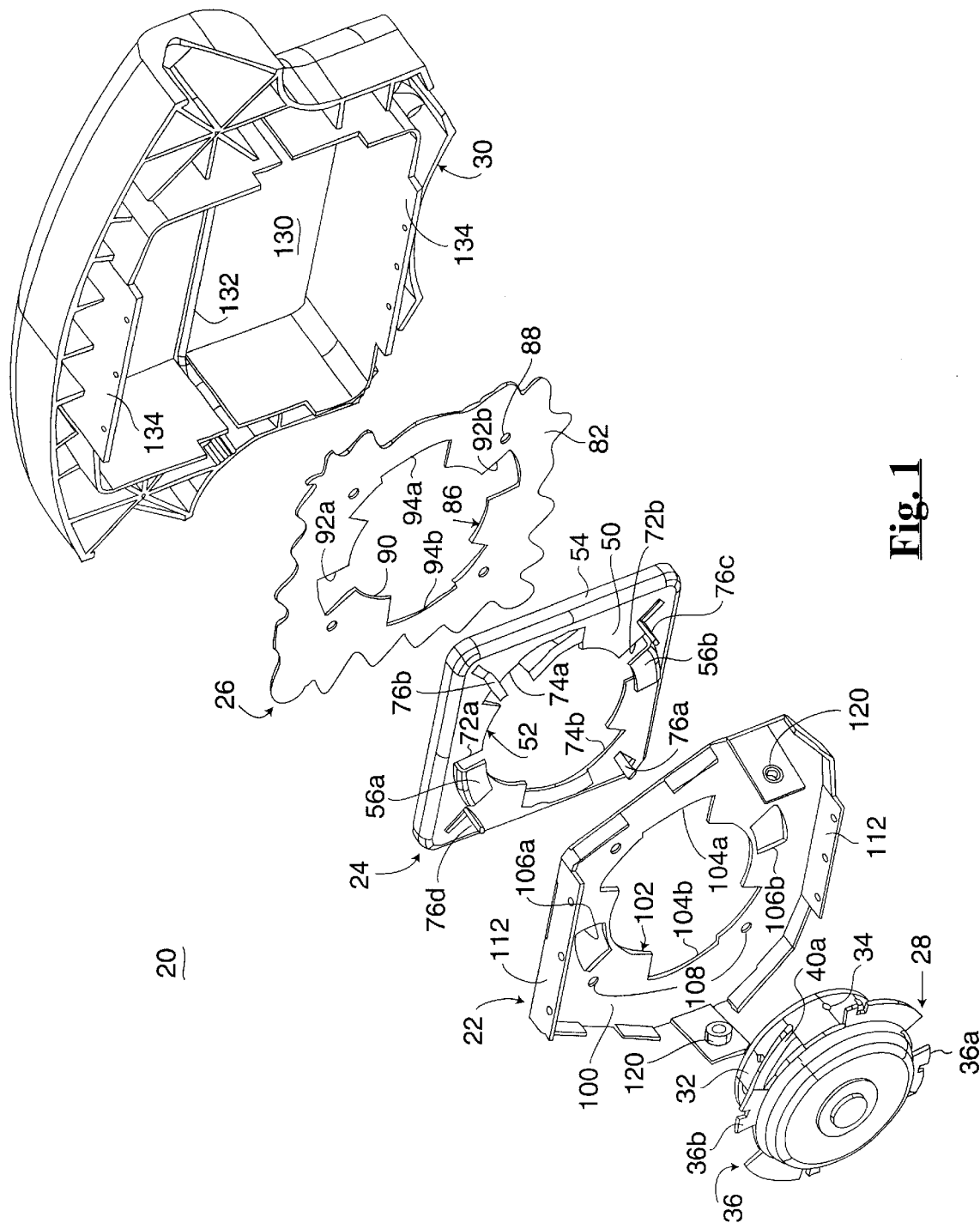
FIG. 1 depicts an assembly view illustrating the major components of the present invention.

FIG. 1 is an assembly view showing the major components of an air bag module 20. These components comprise a housing 22, a retaining member 24, an air bag or cushion 26, an inflator 28 and a cover 30.

Figure 2:
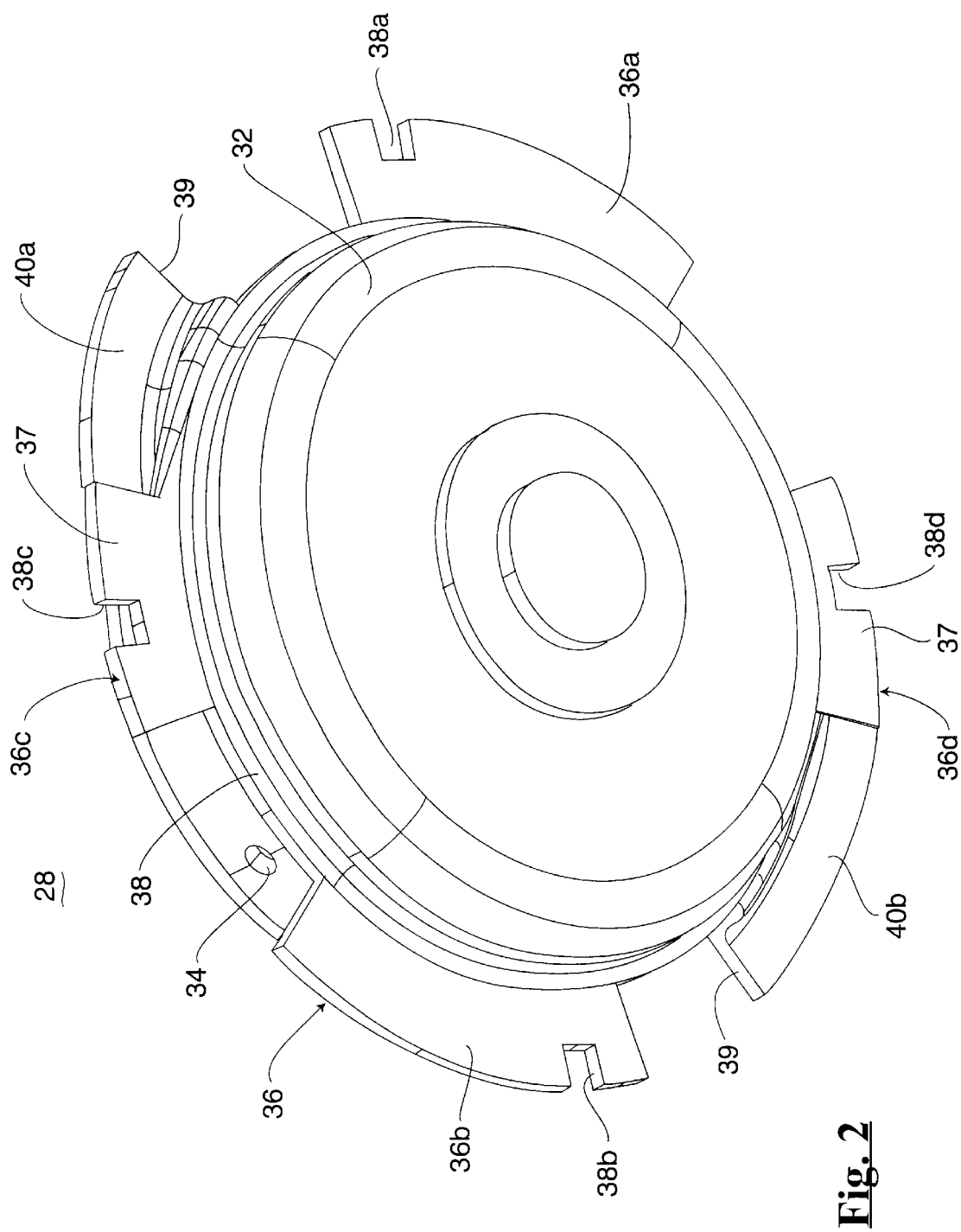
FIG. 2 is an isometric view of an inflator.

Inflator 28, also shown in FIG. 2, comprises a cylindrical body 32 having a plurality of exit ports 34 situated thereabout. A mounting flange generally shown by numeral 36, in the illustrated embodiment, extends from the midpoint of a side wall 38 of the inflator 28. It should be appreciated that the flange can extend from any portion of the inflator. The flange 36 is segmented and forms a plurality of notches between various segments of the flange 36. More particularly, the flange 36 includes two flat opposing segments 36a and 36b which extend radially outward. The flange 36 additionally includes two additional opposing segments 36c and 36d. Each flange segment 36a–36d includes a respective small notch 38a–d which is capable of receiving a bent-over tab extending from the retainer member. The flange segments 36c and 36d respectively include a flat radially extending portion 37 and upwardly extending ramp portions (also referred to as a ramp) 40a and 40b respectively. As can be seen, the ramp portions 40a and 40b extend smoothly away from the corresponding radially extending portion 37 of the flange segments 36c and 36d. The leading edge of each ramp portion is shown by numeral 39 and defines an open face or receiving portion. The angle of the ramp, relative to the flat flange segments, is chosen so that it allows interaction with the ramp located on the mating component to provide positive, smooth and effective clamping. In addition, the ramps 40a and 40b in the illustrated embodiment are manufactured by stamping a blank that does not contain the flange, and then forming the ramps and notches. As is known in the art, the inflator 28 may take any of a number of forms such as a cold stored gas inflator, a hybrid inflator or a solid propellant inflator. In each case, upon receipt of a control signal indicative of a crash, inflation gas is produced or released to inflate a closely spaced air bag such as air bag 26.

As will be seen from the discussion below, the inflator is inserted from an underneath side of the housing 22 through a hole and twisted in place. This twisting action positively engages the retainer member 24 and sandwiches the air bag 26 between the retainer member 24 and the housing 22 while securing the inflator 28 to the retaining member which may comprise a ring or plate 24.

Figure 3A:
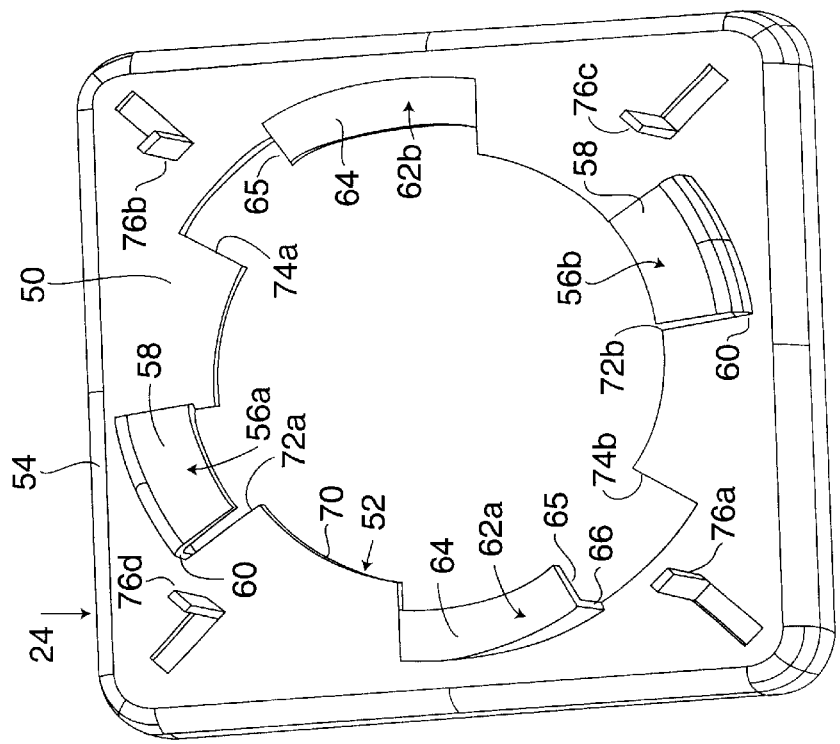
FIGS. 3a and 3b illustrate various views of a retaining member (such as a plate or ring).
Figure 3B:
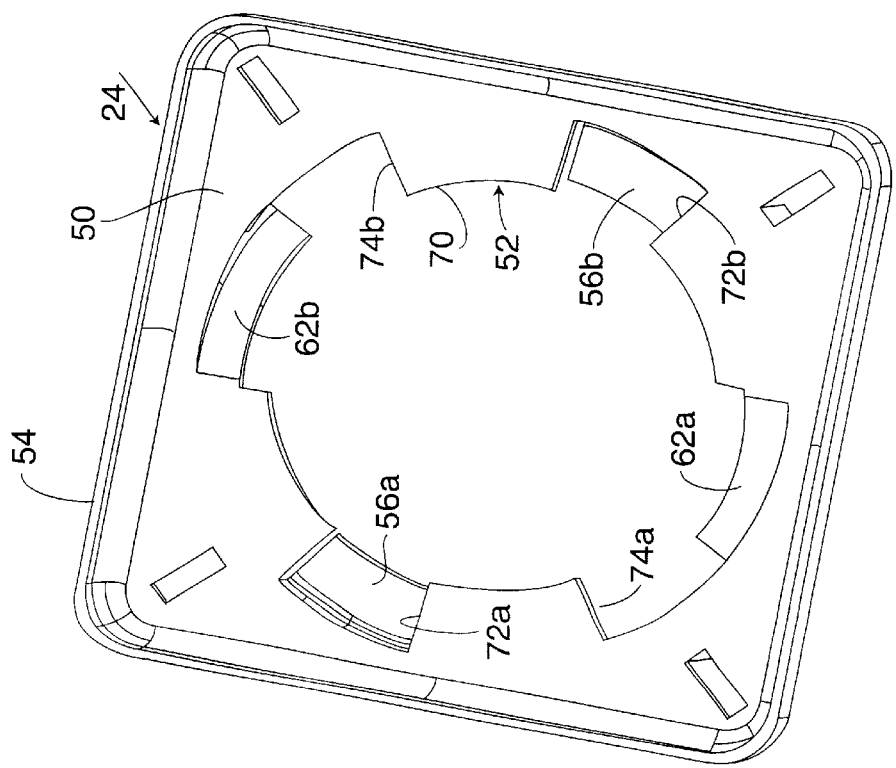

Reference is briefly made to FIGS. 3a and 3b, as well as FIG. 1. The retaining member 24 comprises a plate portion 50 having a central aperture 52. Extending outwardly and upwardly from the plate 52 are optional side walls 54. As can be seen, if used, the side walls 54 give the retaining ring 24 a cup-like appearance. The retaining ring can take many shapes such as square, rectangular, or circular. The retaining ring 24 is typically made of metal or plastic and formed, proximate the central opening, with a plurality of receiving tabs. The tabs can be added to the plate or formed as an integral part thereon. Tabs 56a and 56b are positioned opposite each other and formed as upraised, integral portions of the plate 50. These tabs are L-shaped and include a radially, inwardly extending portion 58 and a vertically extending standoff or wall 60. As can be seen from the various views, the inwardly extending portions 58 are spaced parallel to the plane of the plate 50. The retaining member or ring 24 additionally includes a plurality of opposing ramped tabs 62a and 62b. Each of the ramped tabs includes a ramped engagement surface 64, a side wall 66 and a leading edge 65 defining an open face, mouth or receiving end. The ramped tabs extend below the generally flat undersurface of the plate 50 as shown in FIG. 3a. Central aperture 52, mentioned above, includes circular portion 70, and two opposing notches or openings 72a and 72b which are formed when the tabs 58a and 58b are separated from the plate 50. The opening 70 includes two larger dimension slots, notches or openings 74a and 74b which are positioned respectively under and adjacent the ramped tabs 62a and 62b. The retaining member 22 further includes a plurality of integrally formed, outwardly extending retention tabs 76a, 76b, 76c and 76d.

Figure 4:
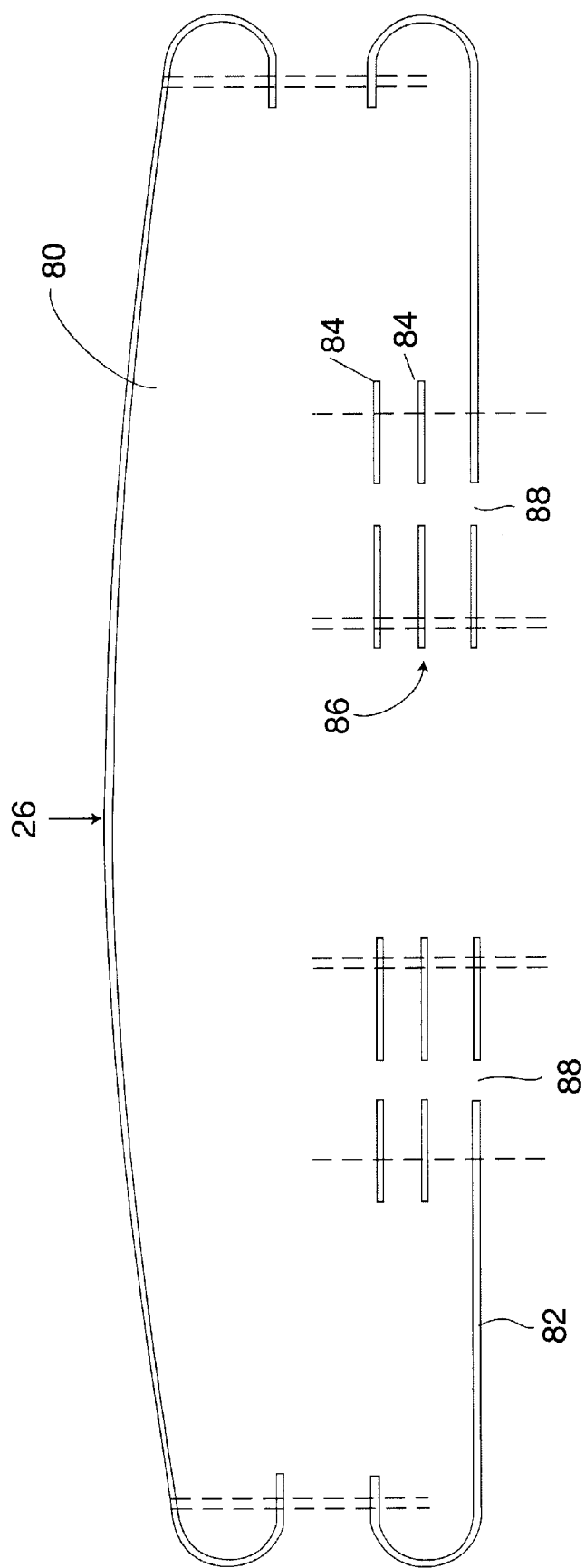
FIG. 4 diagrammatically illustrates an air bag.

Reference is briefly made to FIG. 4 which diagrammatically illustrates the various features of an air bag 26. As is known in the art, an air bag is manufactured by one or more fabric or plastic film sections forming a one-piece or multi-piece construction. The bag can also be woven, knitted, blown, vacuum molded, etc. When formed the air bag comprises an inflatable cushion portion 80 and a neck portion 82. The neck portion 82 is positioned proximate the inflator 28. This neck portion is often reinforced by a number of layers of material 84 which function as a reinforcement and heat shield to protect the other surrounding portions of the air bag 26. The neck portion 82 of the present invention, including those other layers of material 84, includes a central opening 86 and a plurality of smaller openings 88, also shown in FIG. 1. Reference is again made to FIG. 1 which shows the neck portion 82 of the air bag. The additional heat shielding layers 84 and the cushion portion 80 have been removed for the purpose of clarity. As can be seen, the opening 86 is shaped similar to the opening 52 having a central portion 90 and two extending notches 92a and 92b which are of similar size to the openings 72a and 72b in the plate 50. The opening 86 further includes two optional notches 94a and 94b which are of similar size to notches 74a and 74b of the plate 50. During assembly of the air bag module 20 the retaining member 24 is inserted within the center opening 86 and manipulated such that the retention tabs 76a–76d extend through one of the smaller openings 88 with the various complementary features such as notches 74a and 92a and 74b and 92b, etc. of the holes 52 and 58 in alignment.

Reference is again made to FIG. 1 and more particularly to the housing 22 and cover 30. The major purpose of the housing 22 is to provide a backing plate upon which the air bag 26 is positively secured to avoid inflation gas leaking therefrom and to provide a reaction surface during deployment. In its simplest form the housing 22 may comprise a base plate 100 having a central opening 102 shaped similar to the opening 86 in the air bag. However, in the embodiment shown, the housing 24 includes upraised walls 112 which extend downwardly from the plate 100. The opening 102 includes larger extending notches or portions 104a and 104b and optional extending smaller notches or portions 106a and 106b. Notches 106a,b may be extensions of opening 102 or separated therefrom by a portion of the plate 100. The plate 100 additionally includes a plurality of smaller tab receiving openings 108. These downwardly extending walls contact the inner portions of the cover. The housing and cover are then secured together by some means such as rivets. The precise way the cover and the housing cooperate is not particularly relevant to the present invention albeit that the cover is secured to the housing in a manner so that it will not be dislodged from the housing during inflation of the air bag. The housing 22 or plate 100 may include a plurality of extending mounting fasteners such as the threaded inserts 120, studs or other features which are used to mount the module 20 to a cooperating structure within the vehicle. Obviously, if the module 20 were used as a driver side module, the fasteners 120 such as threaded studs, would be secured into a structural component within the steering wheel. The fasteners 120 could optionally extend from the retaining member 24 through cooperating openings in the neck 82 of the air bag 26 (not shown) and through other openings (not shown) in the plate 100.

The module cover 30 is also shown in FIG. 1. This cover 30 is only diagrammatically illustrated as many different configurations of the cover can be used with the present invention. As is known in the art, the purpose of the cover is to provide a decorative fascia which encloses and protects the air bag. A typical cover will include a top 130 which is designed with a visible or invisible stress point, often referred to as a tear seam 132. The cover includes extending sides 134 which are attached to the housing 22 (or plate 100) at 112. In the embodiment illustrated, the cover is of a generally square or rectangular configuration, conforming to the shape of the housing.

As can be appreciated from the above, the inflator 28 is inserted within opening 102 from the underside of the housing 22. This feature permits the other portions of the module, i.e., the cover 30, retaining member 24, air bag 26 and housing 22 to be assembled prior to insertion of the inflator 28 therein.

The assembly and operation of this embodiment of the invention is as follows. As mentioned above, the retaining member 24 is inserted within opening 86 of the air bag 20 and manipulated so that openings 52 and 90 are in conformity and the tabs 76a–d extend through one of the openings 88 in the air bag 26. The tabs 76a–d are then fit through a corresponding one of the openings 108 in the housing plate 100. Two of the tabs such as 76a and 76b can be bent outwardly to partially lock the retaining member 24, air bag 26 and housing 22 together. Subsequently, the cushion 80 of the air bag 26 is folded into a compact configuration and positioned about opening 102 of the housing plate 100. Thereafter the cover 30 is secured to the housing 22.

Figure 5:
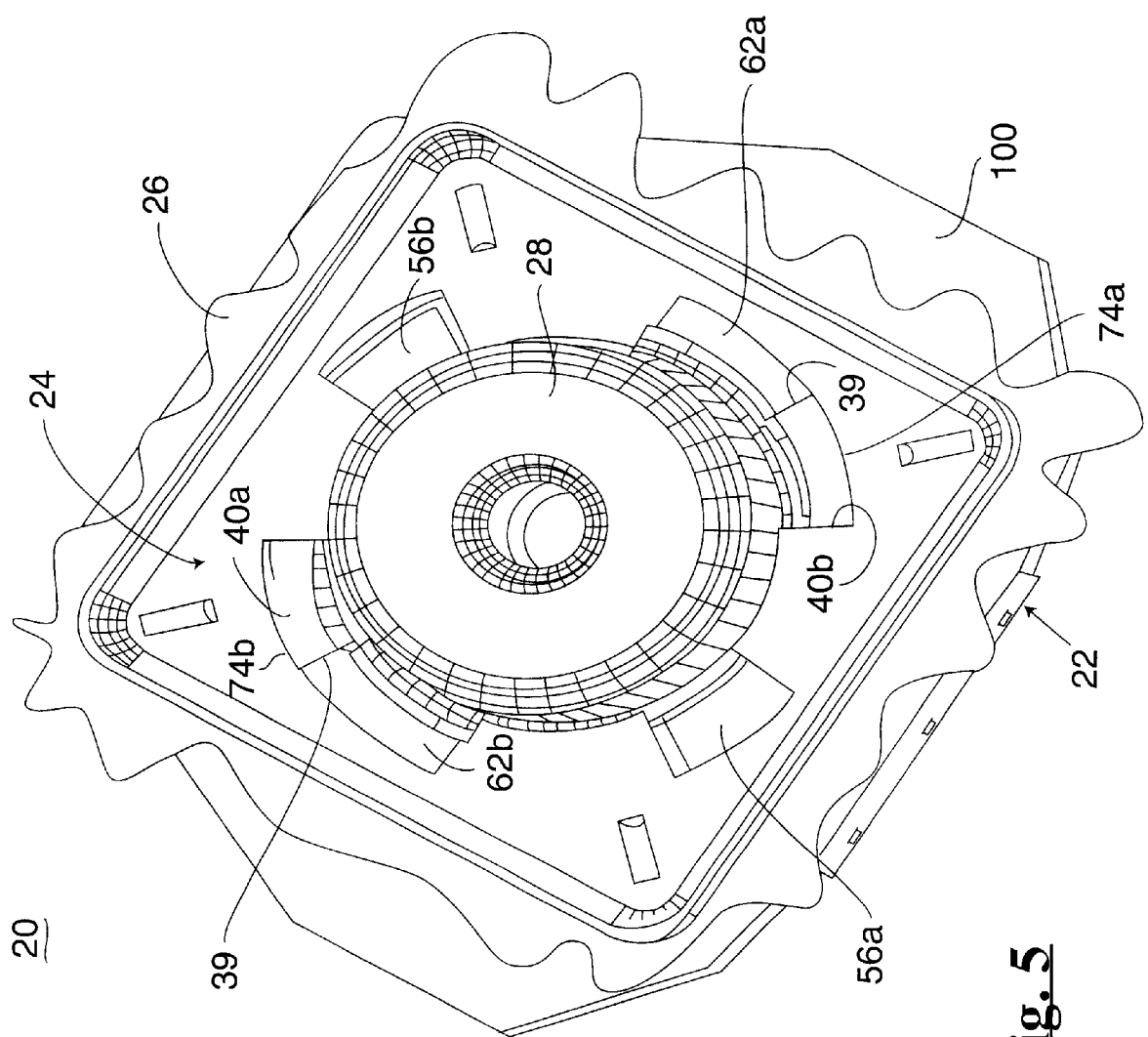
FIGS. 5 and 6 illustrate assembly steps of a first embodiment of the invention.
Figure 6:
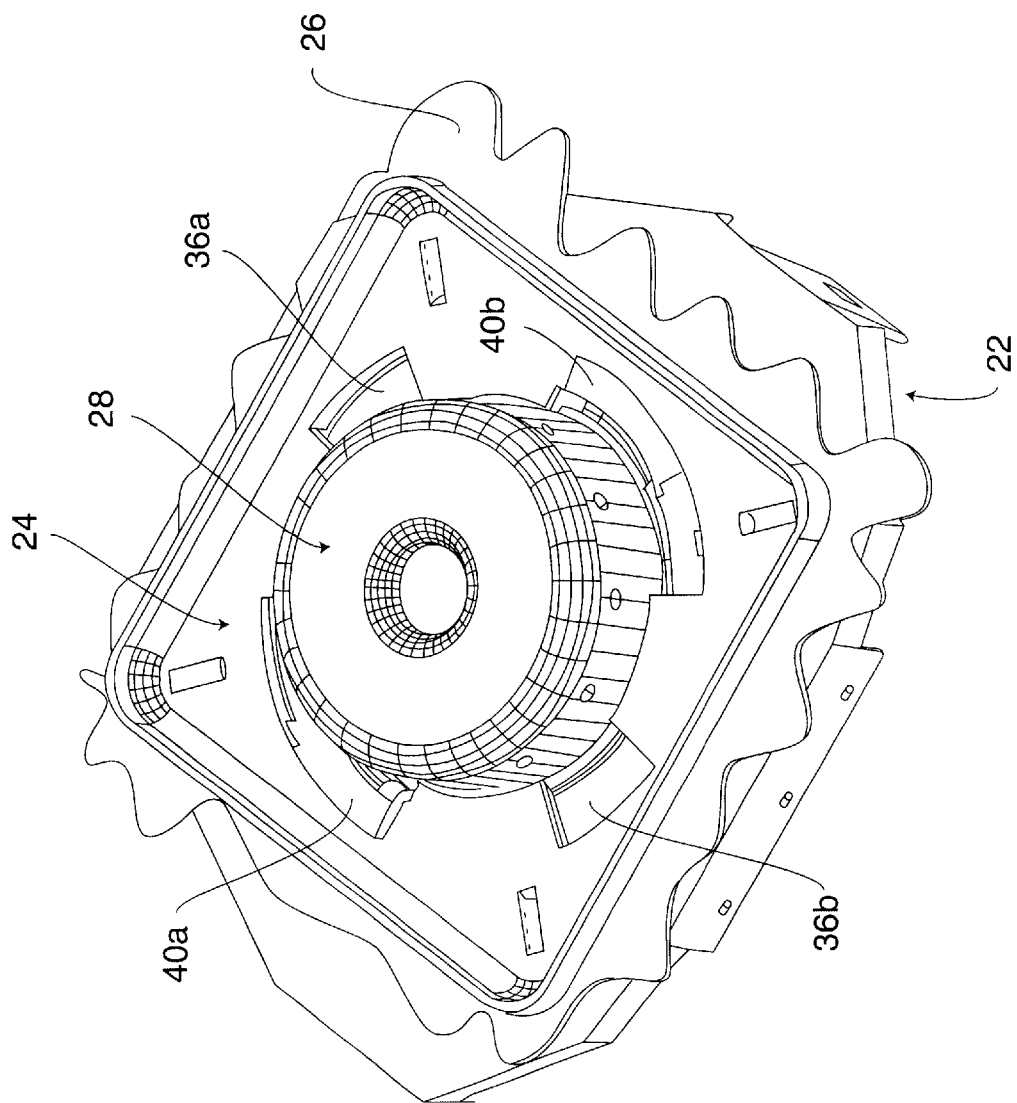

Subsequently, the inflator 28 is secured to the above-assembled portions of the module 20. Reference is briefly made to FIG. 5 which illustrates a top isometric view showing the inflator positioned upon the plate 100 of the housing 22 and below the retainer member 24 with the leading edges of each of the ramped flanges 40a and 40b positioned at the respective opening or mouth 65 of the ramped tabs 62a and 62b. For the purposes of clarity, the cover has been removed from FIGS. 5 and 6. As can be appreciated, the forward tip or leading edge 39 of the respective ramp 40a and 40b extends above the opening 74a,b of the respective ramped tab 62a and 62b. Subsequently the inflator is rotated in a counterclockwise direction as viewed from the inside of the retaining member (as also illustrated in FIG. 6.) This action generates a clamp-fit between the ramped flanges 40a and 40b and the corresponding ramped portion 64 of the ramped tabs 62a and 62b respectively. Further, if used, this rotation also rotates the radially extending flanges 36a and 36b of the inflator 28 under a corresponding one of the retention tabs 56a and 56b.

Figure 7:
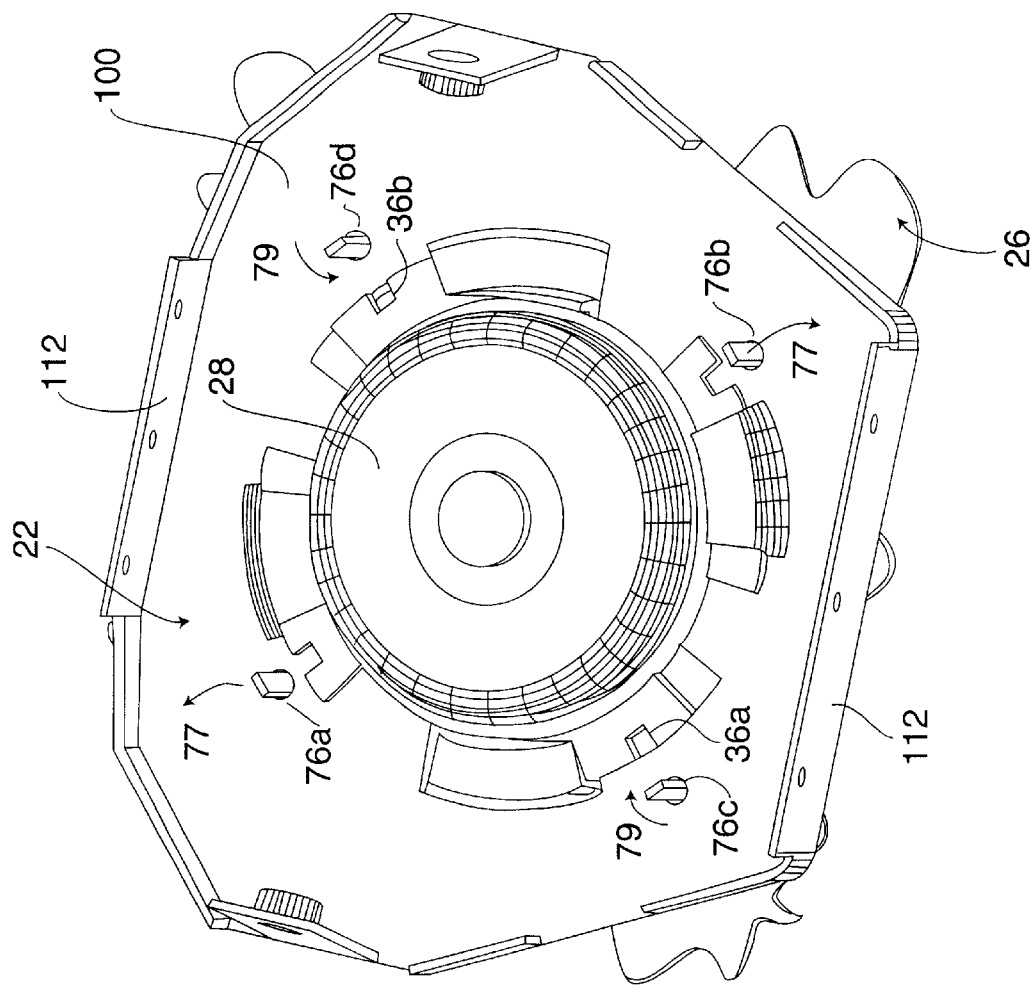
FIG. 7 illustrates a plan view of the bottom of a housing and inflator.

As can be appreciated, the rotation of the inflator 28 clamps the retaining member 24 to the inflator, thereby sandwiching the air bag 26 against the housing plate 100. The orientation of the various parts of the flange 36 and the retaining tabs 76a–76b can also be seen in FIG. 7. As mentioned above, some of these tabs 76a and 76b can be bent outwardly (see arrow 77) to initially retain the retaining member 24 to the housing 22 prior to introduction of the inflator. Other initial retaining or position techniques, used in manufacturing, can also be used. The remaining retention tabs 76c and 76d are thereafter bent inwardly (see arrow 79)

and received within one of the notches such as 36a and/or 36b of the flange segments of the inflator 28. As can be appreciated, this arrangement of tab and notch provides an anti-rotation feature preventing the inflator from rotating outwardly.

The operation of the module follows that of a classic air bag module. Upon receipt of a crash signal to the inflator, the propellant or gas stored within the inflator is activated, thereby producing or releasing a quantity of inflation gas which is communicated through inflator ports 34 to inflate the air bag 26. The inflating air bag bears against the underside of the top 130 of the cover 30 causing the tear seam or tear seams 132 to rip apart, thereby providing an opening through which the air bag may continue to deploy to protect the occupant. As the cushion deploys an opposite reaction force is exerted rearwardly against the L-shaped bracket and the ramped surfaces which secure the inflator in the retaining member and housing. In addition, the retaining tabs 76a–76d serve to keep the cushion in position during the deployment.

Figure 8:
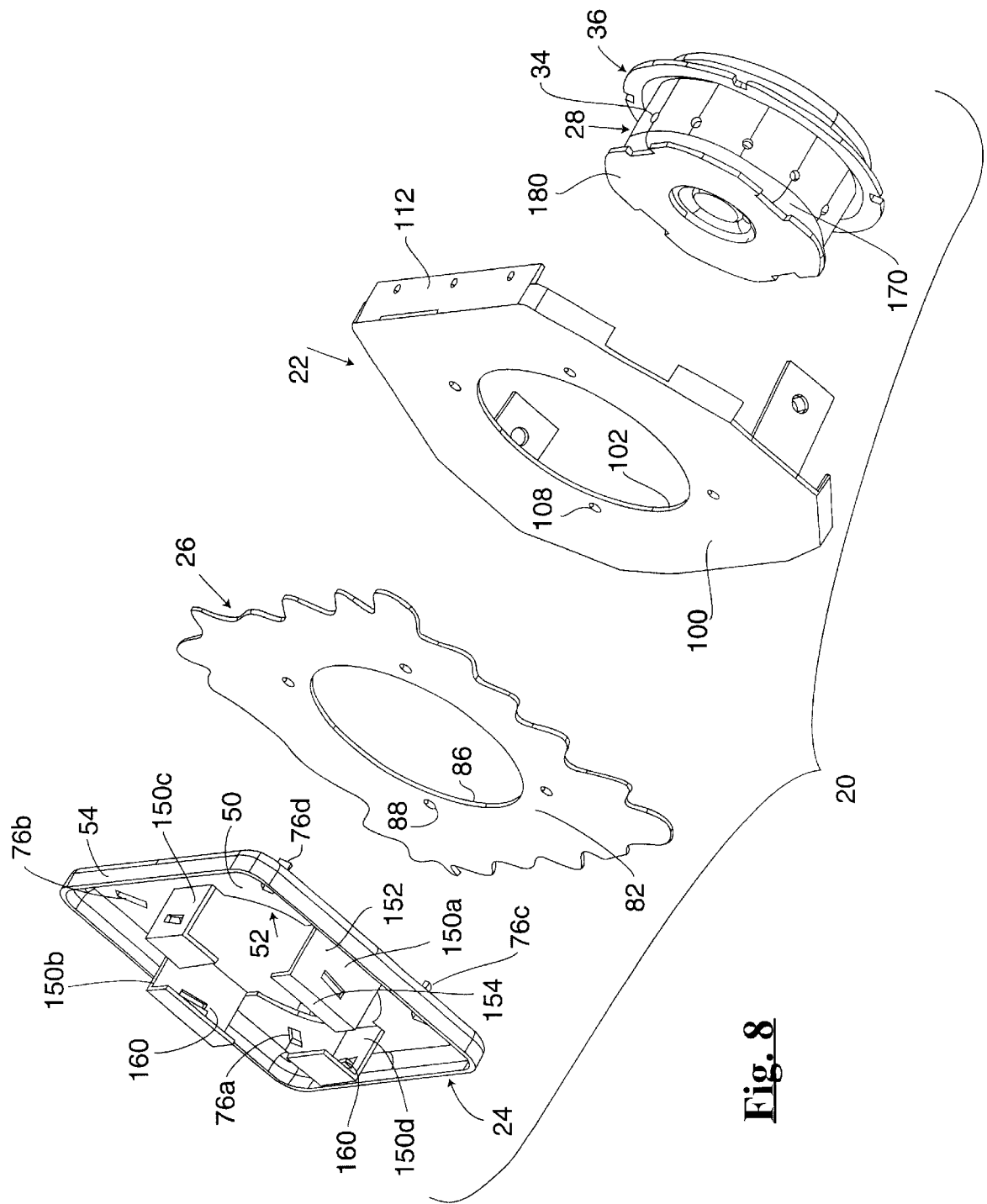
FIG. 8 is an alternate embodiment of the invention.
Figure 9:
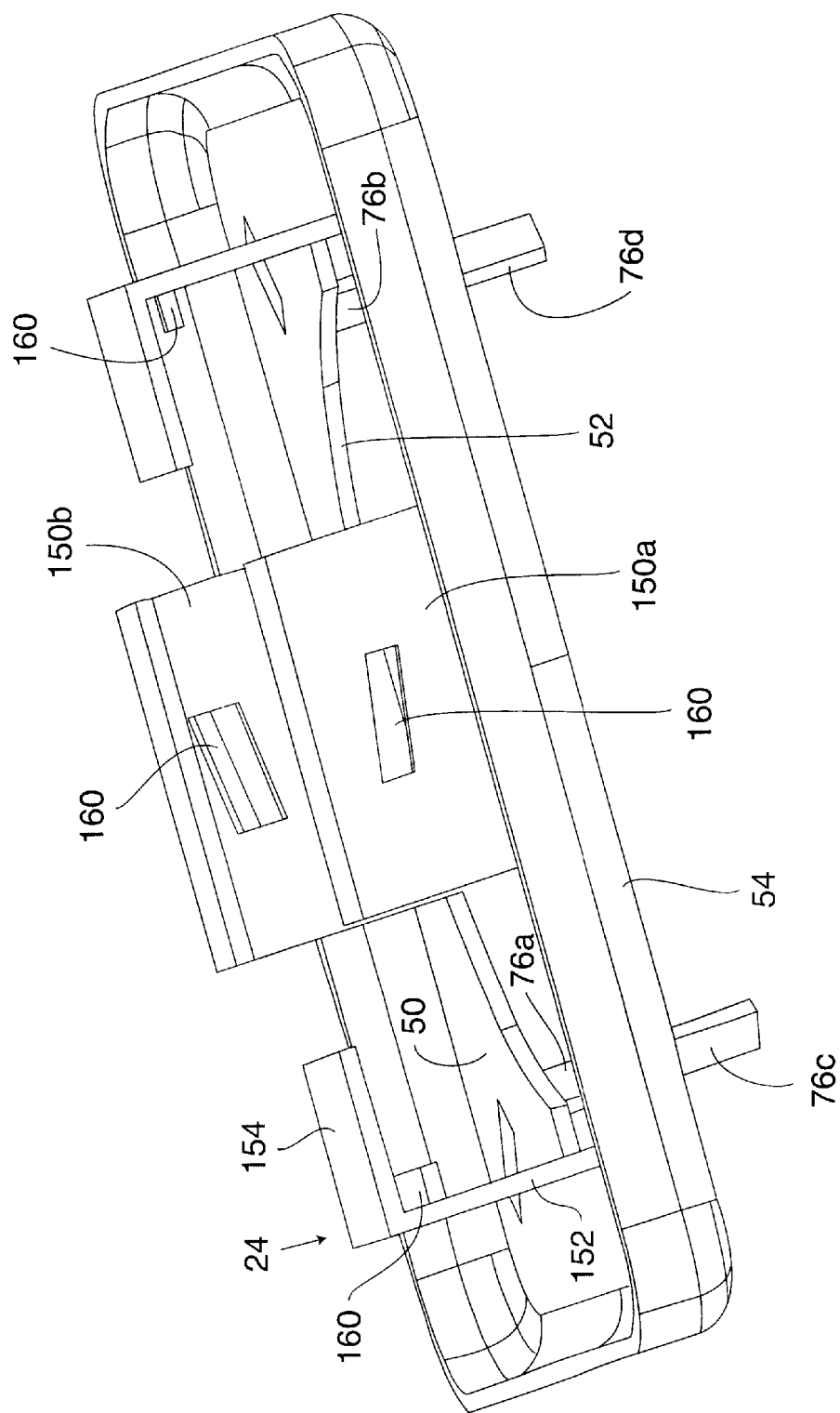
FIG. 9 illustrates an isometric view of a retaining member.

Reference is made to FIG. 8 which illustrates an alternate embodiment of the invention where similar components are identified by the same numerals. More specifically, FIG. 8 shows an alternate driver air bag module 20 comprising a retaining member 24, cushion 26, housing 22 and inflator 28. In this embodiment, the ramped flanges on the inflator 28 of FIG. 1 have been removed and an alternate set of ramps placed in the retaining member 24. The retaining member 24 comprises a plate portion 50 with an optional upwardly extending peripheral wall 54. The center opening 52 is generally circular in shape. The plate material 50 which previously was found in the center of the plate is bent over into two pairs of extending flanges 150a and b and 150c and d. Each of the flanges 150a–d includes upraised leg 152 and an inward, radially extending arm 154. The height and depth of the legs 152 and arms 154 will vary with the height of the inflator 28. Each of the flanges 150a–d includes an inwardly extending ramped tab 160 which is formed by stamping and bending inwardly a portion of each leg 152. As can be seen from FIG. 9 each tab 160 is angled relative to a corresponding arm 154.

Figure 10:
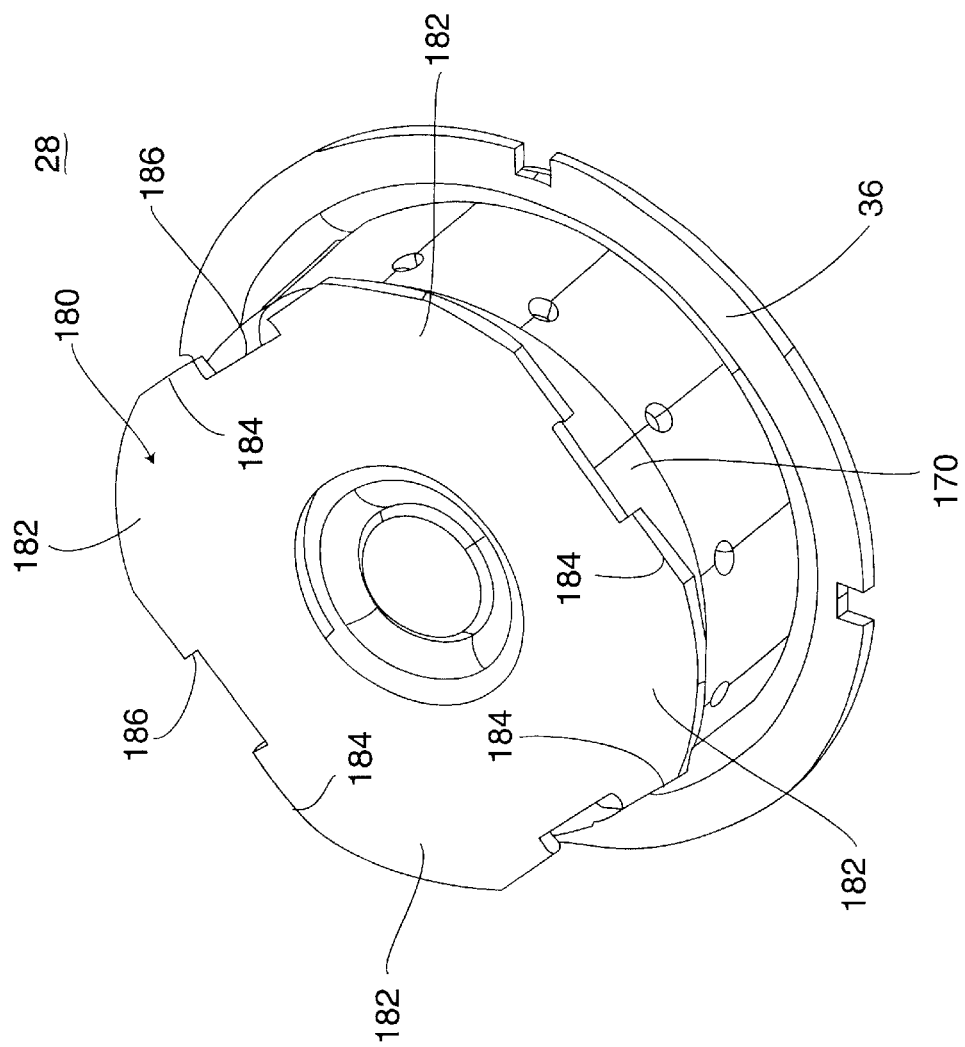
FIG. 10 illustrates an isometric view of an inflator.

The cushion 26 of this second embodiment is identical to the cushion discussed above with the exception that the central opening 86 is generally circular to conform with the circular shape of opening 52. The neck 82 of the air bag 26 includes the plurality of tab receiving openings 88. As can be seen from FIGS. 8 and 9, this retaining member 24 additionally includes the plurality of bent-over retaining flanges 76a–76d. The housing 22 may comprise a plate 50 or, alternatively, may be formed as an open sided container or box with the inclusion of the peripheral wall 112 (as used in FIG. 1). The plate 100 similarly includes the plurality of tab receiving openings 108. The inflator 28, which is also shown in FIG. 10, is cylindrically shaped and includes a circular, radially extending flange 36 which extends from the side wall of the inflator. The location of this flange is determined from the parameters of the module components. Secured to the top 170 of the inflator 28, such as by welding, is a mounting plate or flange 180. The mounting plate could be integrally formed as part of the body of the inflator. The mounting plate includes four radially shaped corners 182. Each side 184 of the plate 180 is flat and further includes an inwardly directed notch 186. The diameter of the mounting plate 180, that is the distance measured diagonally between opposing, radially shaped corners 182, is slightly smaller than the diameter of the opening 52 of the retaining member 24.

During assembly, the retaining member 24 is slid through the center opening 86 in the air bag 26 and manipulated so that the tabs 76a–d extend through a respective tab receiving opening 88 in the air bag. Subsequently, the tabs 76a–d are received through one of the tab receiving openings 108 in plate 100. One or more of these tabs, such as tab 76a, can be bent over to temporarily secure the retainer 24, air bag 26 and plate 100 (or housing 22) together as described above. Thereafter, the air bag 26 can be folded, a cover such as 30 secured to the housing 22 and the inflator 28 inserted and locked in place. Alternatively, the inflator may first be inserted within the retaining member and the air bag can later be folded with the cover and then placed upon the air bag.

Figure 11:
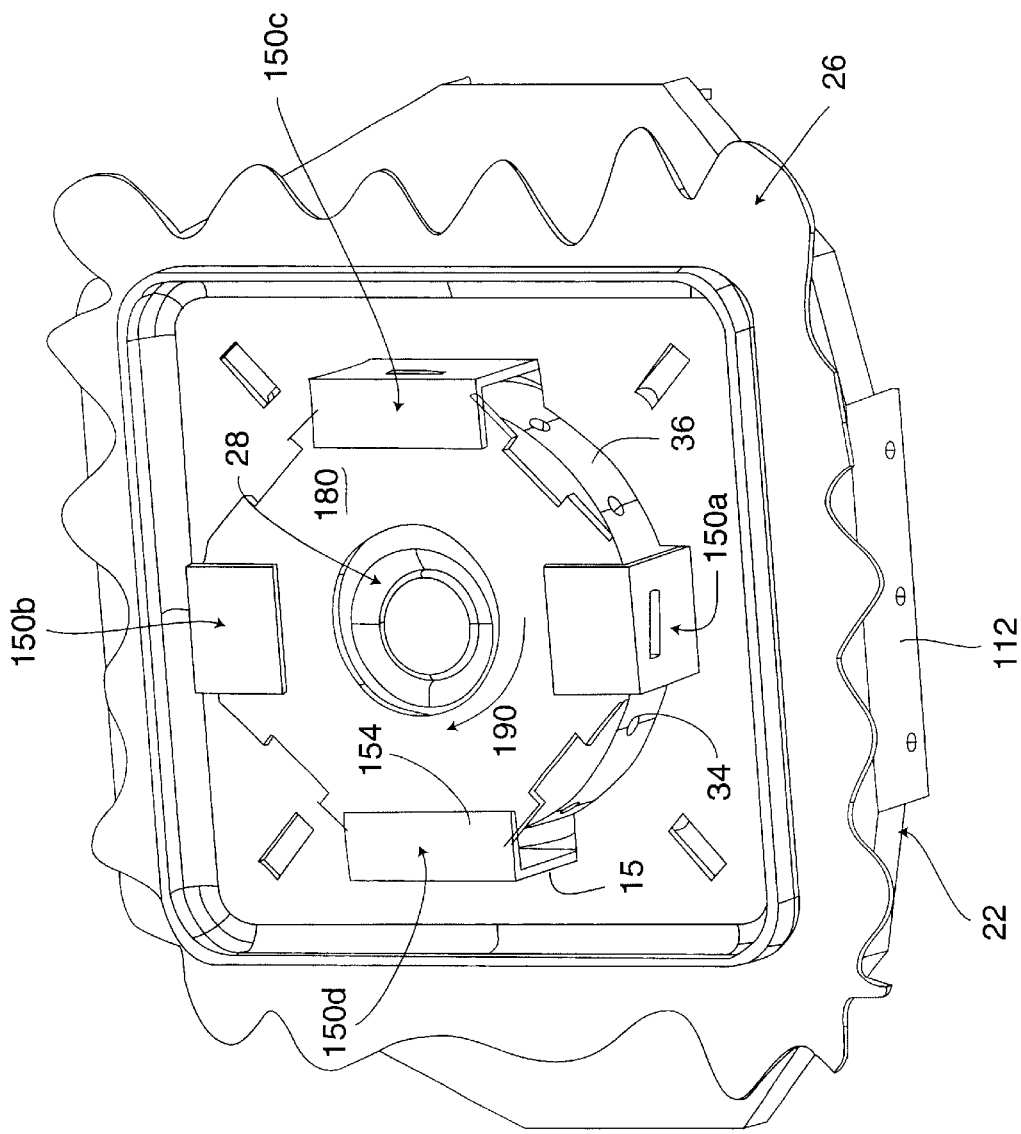
FIG. 11 illustrates an assembly step.

As with the earlier embodiment, the inflator 28 is inserted from the bottom side of the housing 22 into the retaining member 24. The inflator is oriented, prior to insertion within the housing 22, such that each notch 186 lies below a corresponding, inwardly extending ramped tab 160. In this manner, as the inflator 28 is inserted through the housing and through and into the retaining member 24, the plate 180 will pass across the ramped tabs 160 as these tabs 160 are received in and through each corresponding notch 186. The inflator is inserted within the retaining member 24 until the top of the plate 180 butts against the bottom of each of the radial arms 154. This relationship is shown in FIG. 11. For clarity, the cover has been removed.

The inflator 28 is rotated in a counterclockwise manner (see arrow 190 of FIG. 11). As the inflator 28 including its plate 180 rotate, a leading edge 184 of each of the curved corners 182 enters into the wide mouth portion 65 of the ramped tab 160. Subsequent rotation of the inflator 28 and plate 180 causes the corners 182 to be trapped between the ramped tabs 160 and the radial arms 154 also drawing the inflator flange 36 inwardly and clamping the cushion 26 and plate 100 (of housing 22) together. Clockwise rotation could be included by changing the direction of the ramps.

Many changes and modifications in the above-described embodiment of the invention can, of course, be carried out without departing from the scope thereof. Accordingly, that scope is intended to be limited only by the scope of the appended claims.

What is claimed is:

1. An air bag module (20) comprising:

a housing (22) having a first opening (102) within a first housing portion (100), a retaining member (24) having a second opening (52), an air bag (26) having an inflatable cushion portion (80) and a neck portion (82), the neck portion is located between the housing and retaining member (24), a cover (30) to protect the air bag, the cover being opened by the air bag upon inflation thereof, and an inflator (28) received within the first opening from a bottom of the first housing portion (100) and into the second opening (52), the inflator including a flange (36);

wherein one of the retaining member and the inflator includes a ramped portion, formed of a stamping, such that when an edge of the inflator flange is located proximate a respective open face of the ramp portion and the inflator rotated, the flange engages the ramped portion and is drawn toward the retaining member thereby sandwiching the housing and air bag therebetween.

2. An air bag module (20) comprising:

a housing (22) having a first opening (102) within a first housing portion (100), a retaining member (24) having a second opening (52), an air bag (26) having an inflatable cushion portion (80) and a neck portion (82), the neck portion is located between the housing and retaining member (24), and an inflator (28) is received within the first opening from a bottom of the first housing portion (100) and into the second opening (52), the inflator including a flange (36);

wherein one of the retaining member and the inflator includes a ramped portion, formed of a stamping, such that when an edge of the inflator flange is located proximate a respective open face of the ramp portion and the inflator is rotated, the flange engages the ramped portion and is drawn toward the retaining member, thereby sandwiching the housing and air bag therebetween.

3. An air bag module (20) comprising:

a housing (22) having a first opening (102) within a first housing portion (100), a retaining member (24) having a second opening (52), an air bag (26) having an inflatable cushion portion (80) and a necks portion (82), the neck portion is located between the housing and retaining member (24), and an inflator (28) is received within the first opening from a bottom of the first housing portion (100) and into the second opening (52), the inflator including a flange (36);

wherein one of the retaining member and the inflator includes a ramped portion, such that when an edge of the inflator flange is located proximate a respective open face of the ramp portion and the inflator is rotated, the flange engages the ramped portion and is drawn toward the retaining member, thereby sandwiching the housing and air bag therebetween.

\* \* \* \* \*